(No Model.) 3 Sheets—Sheet 1.

J. F. BELLEVILLE.
FEED WATER HEATER.

No. 336,283. Patented Feb. 16, 1886.

WITNESSES:
E. B. Bolton
Geo. H. Fraser.

INVENTOR:
Julien François Belleville
By his Attorneys,
Burke, Fraser & Kennedy (No Model.) 3 Sheets—Sheet 2.

J. F. BELLEVILLE.
FEED WATER HEATER.

No. 336,283. Patented Feb. 16, 1886.

WITNESSES:
Geo. H. Fraser.
E. B. Bolton.

INVENTOR:
Julien François Belleville
By his Attorneys,
Burke, Fraser & Connett (No Model.) 3 Sheets—Sheet 3.
J. F. BELLEVILLE.
FEED WATER HEATER.
No. 336,283. Patented Feb. 16, 1886.
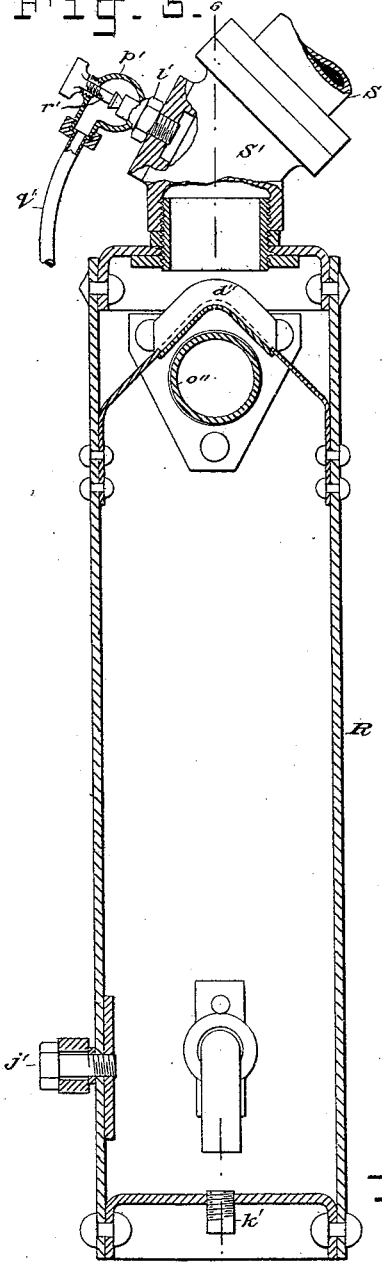
Fig. 5.
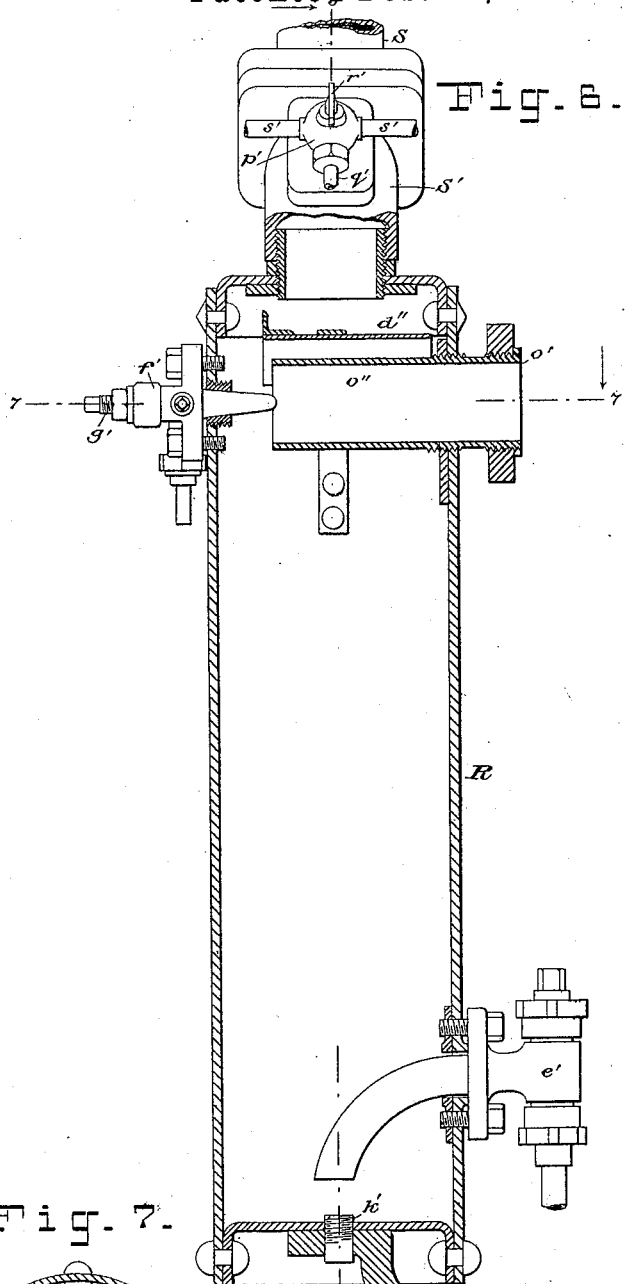
Fig. 6.
Fig. 7.
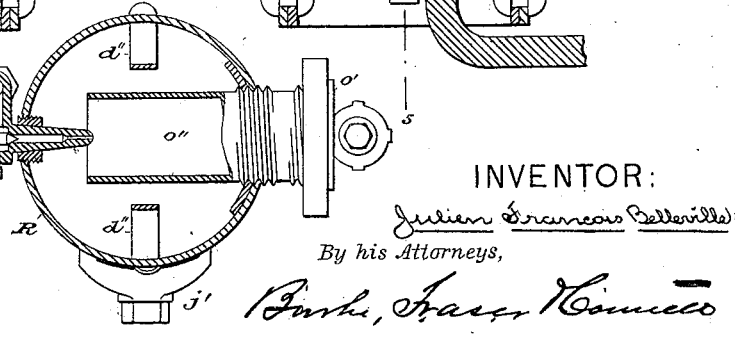
WITNESSES:
E. B. Bolton
Geo. H. Fraser
INVENTOR:
Julien Francois Belleville
By his Attorneys,

UNITED STATES PATENT OFFICE.

JULIEN FRANÇOIS BELLEVILLE, OF PARIS, FRANCE.

FEED-WATER HEATER.

SPECIFICATION forming part of Letters Patent No. 336,283, dated February 16, 1886.

Application filed November 17, 1885. Serial No. 183,064. (No model.) Patented in France July 12, 1884, No. 163,274.

*To all whom it may concern:*

Be it known that I, JULIEN FRANÇOIS BELLEVILLE, a citizen of the French Republic, and a resident of Paris, France, have invented certain Improvements in Feed-Water Apparatuses for Steam-Generators, of which the following is a specification.

My invention relates to an apparatus for heating feed-water for steam-generators for separating the inorganic matter held in suspension and in solution therein, and for feeding the same to the generator. This mechanism comprises what I call a "purifier" and a "dejecteur," the peculiar features of which and their mode of operation will be hereinafter fully described.

The novel features of my invention will be particularly defined in the claims.

Figure 1:
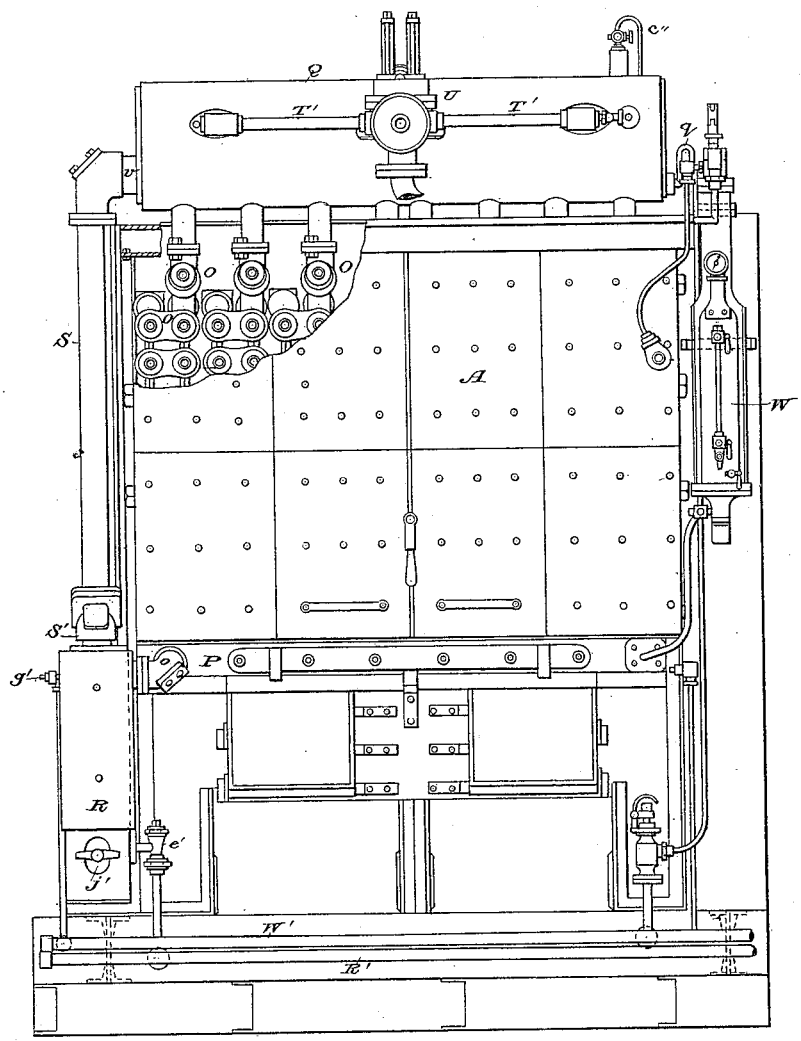
Figure 2:
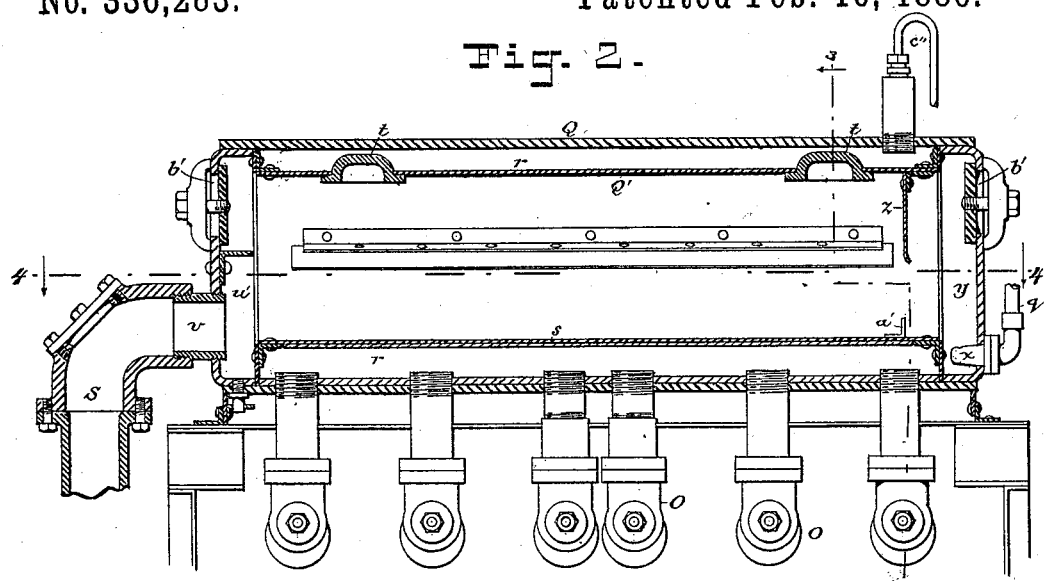
Figure 4:
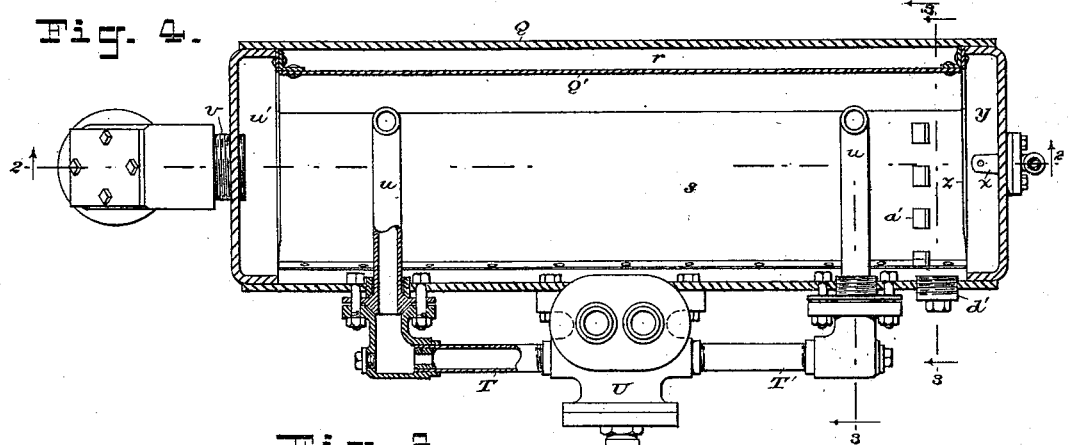
Figure 3:
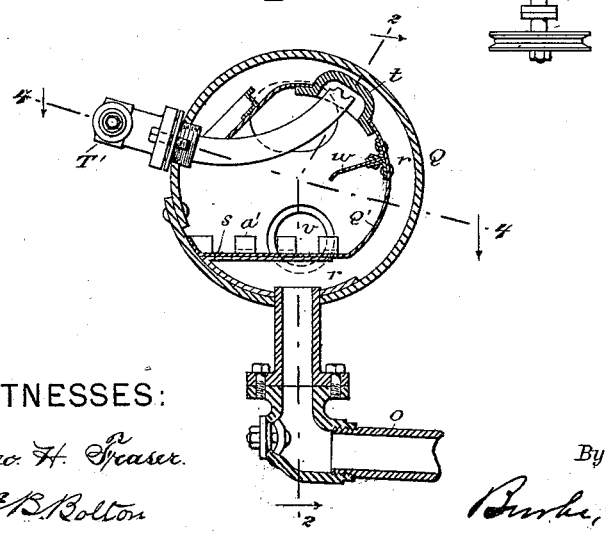

In the drawings which serve to illustrate my invention, Figure 1 is a front elevation, on a reduced scale, of a steam-generator to which my feed-water apparatus is applied. In this view I have chosen for purposes of illustration a generator made up of elements composed of tubes arranged within a sheet-metal casing; but I do not limit the application of my apparatus to any particular form of generator. Figs. 2, 3, and 4 illustrate the purifier and steam-drum, Fig. 2 being a longitudinal section taken on line 2 2 in Fig. 3, Fig. 3 being a transverse section taken on line 3 3 in Fig. 2, and Fig. 4 being a longitudinal section taken on line 4 4 in Fig. 3. Figs. 5, 6, and 7 illustrate the dejecteur, Fig. 5 being an axial section on line 5 5 in Fig. 6, Fig. 6 an axial section on line 6 6 in Fig. 5, and Fig. 7 a transverse horizontal section on line 7 7 in Fig. 6.

Referring to the general view, Fig. 1, A represents in general the steam-generator; O, the tubes arranged within the casing and forming the generator elements, and P the collector with which the tubes O of the elements all connect at the bottom. This generator forms no part of my present invention, and it will not be necessary for me to describe its construction more minutely herein. Q is the purifier and steam-drum, mounted on the top of the generator, and connected with the upper ends of the tubular elements O, whereby the steam from all the elements passes into the same. The feed-water, from any source, enters the purifier Q at one end by a pipe, q, and flows from the purifier at the other end by a pipe, S, down to the dejecteur R, whence it flows to the generator elements O through an elbow-pipe, o, which connects the dejecteur with the collector P.

Referring now to Figs. 2, 3, and 4, I will describe the construction of the purifier and steam-drum. Q is the purifier-drum or cylinder, which is mounted in any convenient manner on the fire-front or façade of the generator. This drum is secured to the tops or upper ends of the generator elements O through the medium of elbows, as clearly shown in Figs. 2 and 3. Q' is an inner party-cylindrical diaphragm arranged within the cylinder Q, and secured thereto in any manner. This diaphragm is substantially concentric to cylinder Q, and is arranged to leave an annular space, r, between them, as clearly shown in Fig. 3. The lower part, s, of the diaphragm Q' is preferably flat, or nearly so, as indicated. In the diaphragm Q' are fixed cups t, to receive the ends of bent pipes u, which connect through the shell of Q with branch pipes T', that lead the steam to the main steam-valve U. The steam from the generator-elements enters the cylinder Q charged with considerable water. The steam enters the annular space r, and is carried around same into the interior space within the party-cylindrical diaphragm Q'. The centrifugal force thus generated causes the heavier water to be thrown outward, while the steam remains at the axis of Q. Thus the water is separated from the steam, falls on and flows along the flat lower surface, s, of diaphragm Q' into the end chamber, u', and thence off at outlet v into return-pipe S to the dejecteur R. The dried steam rises into the cups t and flows out through pipes u. In order to prevent any water that may be borne upward by the steam from passing into pipes u, I prefer to arrange a deflecting-diaphragm, w, below the cups t as a precaution. This diaphragm catches and returns the water.

Referring to the right-hand end of Fig. 2, x is the nozzle of the feed-water pipe q, which enters the end of the cylinder Q and throws the water upward in a jet or spray in the chamber y at that end of the cylinder Q. The water falls back and flows along over the flat surface s of the diaphragm Q', escaping eventually at the outlet v, whence it flows by pipe S to the dejecteur R. The water thus injected into the purifier is suddenly heated, and any calcareous salts that it may hold in solution will be precipitated. The feed-water mixes with the water separated from the steam, and all flows down to the dejecteur together. I usually provide the purifier with a pendent diaphragm, z, to prevent the feed-water from being projected too far into the hollow of the diaphragm Q'; and in order to catch and retain a portion of the insoluble particles injected with the feed-water, I usually mount on the flat surface s, near its end, some obstructing-ledges, a'. The cylinder Q is also provided with hand-holes at b' to enable it to be cleaned conveniently.

In order to prevent the corrosion of the metal due to successive contact with salt-water and damp air, and to maintain the full amount of water in the generator when not heated, I usually provide the purifier Q with a pipe, c'', arranged at the highest point of the same, which pipe connects with the generator at or near its bottom. In the lower end of this pipe may be placed a cock, which will serve to test the fullness of the generator. A hand-hole, d', (shown only in Fig. 4,) permits of the convenient removal of matter caught by the obstructions a'. In the same figure is shown the mode of coupling the pipes u to the pipes T', by means of elbows, whereby a tight joint is obtained, and the parts are made readily separable. The pipe T' may be connected to the elbow by an inner expanding thimble, as shown.

I will now describe more minutely, with reference to Figs. 5, 6, and 7, the dejecteur R, into which the feed-water flows from purifier Q by way of the return-pipe S. R will represent in these figures the cylindrical drum forming the body of the dejecteur, which may be of boiler-iron, and be provided with suitable heads. This is placed at a low level with repect to the generator, its top being by preference a little below the level of the feed-water collector P. S is the return-pipe from the purifier Q, which is connected to the top of the cylinder R through the medium of an elbow-coupling, S'. o' is a flanged coupling, whereby the dejecteur is coupled to the bent pipe o that leads the water to the collector P. This coupling o' has an inward extension, o'', which by preference extends back horizontally beyond the axis of R. d'' is a saddle-like or A-shaped deflection-plate mounted over the extension o'', to prevent the water entering from above from gaining direct access to the eduction-outlet. This water is deflected outward by d'' toward the walls of R, and descends along said walls to rise afterward in the axis of R to the outlet o'. As the movement is relatively slow, the mud and calcareous salts will be continuously precipitated during the descending movement by virtue of their greater density, and will collect at the bottom of R. e' is a cock placed at the bottom of cylinder R, to blow off the collected sediment, and also to effect the proper reduction of the salt in the boiler in order to preserve the proper degree of concentration. $f'$ is a water-injector, which is arranged opposite to the extension o''. This injector receives water from the water-supply by a suitable pipe. The object of this device is to render the circulation of the water in the generator more active when the generation of steam is forced. It is auxiliary to the regular feed-water injector or pump. This injector is supplied with a screw-threaded conical spindle-valve g', whereby the admission of the water may be shut off entirely or regulated to suit the circumstances. The space between the dejecteur-wall and the inner or receiving end of extension o'' is such as to allow of the free influx of water during ordinary flowing service— that is, when the injector $f$ is not in operation. $j'$ is an ordinary hand-hole, to provide access to the interior of R, and k' is a pintle screwed into the bottom of the cylinder R, which is designed to take into a hole in a bracket on the generator front or façade, and thus form a base-support for the dejecteur when in place. I usually arrange a jacket to embrace the upper part of the dejecteur in order to prevent the radiation of its heat. This jacket is shown in place in the general view, but I have omitted it from detail views as a non-essential feature. When the injector projects a jet of water into the axis of the large tubular extension o'', it exerts a lateral draft on the water, which at all times fills the dejecteur and the return-pipe S in the manner of a Giffard injector, and forces the water into the generator. The regular feed mechanism continues to operate in the usual way, and the direct injection by $f'$ into the dejecteur augments the circulation in the generator, and assures its being properly fed even with the hottest fire. I usually provide the dejecteur with a cock, to draw off a little water from time to time to test with the salinometer. This cock is seen in section in Fig. 5, where it is shown as screwed into a cap on the elbow-coupling S'. l' is a tubular spud screwed into the said cap, its outer end being concaved to form a valve-seat. p' is a globular receiver provided with an outlet below, to which is affixed a delivery-tube, q', whereby water is delivered to the testing-vessel. r' is a spindle-valve screwed into the globe p', and adapted to control the tubular outlet-passage in spud l'. When the valve r' is opened, the water escapes at a high temperature into p', and therein disengages the steam which forms the excess of its caloric over that which it can retain at the atmospheric pressure. This steam escapes at lateral tubes s', (seen in Fig. 8,) and the water separated from the steam by centrifugal action flows off tranquilly through the delivery-tube q', where it may be caught for testing. I make no claim to this cock herein. W' represents the main feed-water pipe, which supplies water to the purifier Q through a feed-water regulator, W, and R' is the main blow-off pipe from the dejecteur. The feed-water regulator forms no part of my present invention.

Having thus described my invention, I claim—

1. The combination, with the generator, of the purifier Q, provided with an inlet, x, for the feed-water, and an outlet, v, the return-pipe S, leading to the dejecteur, the dejecteur R, constructed substantially as described, and the pipe o, connecting the dejecteur with the collector P of the generator, all arranged to operate substantially as described.

2. The purifier Q, provided with a party-cylindrical diaphragm, Q', pipes u, to lead off the steam, and an outlet, v, to lead off the water separated from the steam, substantially as and for the purposes set forth.

3. The cylindrical purifier Q, provided with an inner party-cylindrical diaphragm, Q', a chamber, y, and a feed-water inlet, x, at one end, an outlet, v, for the feed-water at the opposite end, a cup, t, in diaphragm Q', to receive the end of the steam-outlet pipe u, and an inlet for the steam from the generator, said inlet being arranged to admit the steam to the annular space r, substantially as set forth.

4. The combination, with a tubular steam-generator, of the drum-like purifier Q, arranged horizontally over the generator, and connected at its bottom side with the upper ends of the generator-tubes, and provided with a diaphragm forming a flat surface or floor, s, for the feed-water to flow over, also with a feed-water inlet at one end and a feed-water outlet at the other end, and also with a steam-outlet separated from the steam-inlet by said diaphragm, whereby the incoming steam impinges directly upon the bottom of floor s before it passes to the steam-outlet, substantially as described.

5. The dejecteur R, provided with the prolongation or extension o'' at its outlet o', and the feed-water injector f', all constructed and arranged to operate substantially as and for the purposes set forth.

In witness whereof I have hereunto signed my name in the presence of two subscribing witnesses.

JULIEN FRANÇOIS BELLEVILLE.

Witnesses:
 EDWARD P. MACLEAN,
 AMAND RITTER.